US008069349B1

(12) United States Patent
Israel et al.

(10) Patent No.: US 8,069,349 B1
(45) Date of Patent: *Nov. 29, 2011

(54) METHOD OF SECURE FILE TRANSFER

(75) Inventors: Jeffrey Israel, Columbia, MD (US);
Colin Richmond, Westminster, MD (US); Darrel Sharpe, Millersville, MD (US); Wohlgemuth Erik, Westminster, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 1461 days.

This patent is subject to a terminal disclaimer.

(21) Appl. No.: 11/268,411

(22) Filed: Nov. 2, 2005

(51) Int. Cl.
*H04L 29/06* (2006.01)

(52) U.S. Cl. ........ 713/165; 713/164; 713/150; 709/201; 726/26

(58) Field of Classification Search .................. 713/150, 713/164, 165; 726/26; 709/201
See application file for complete search history.

(56) References Cited

U.S. PATENT DOCUMENTS

| 5,940,591 | A | 8/1999 | Boyle et al. | |
| 6,584,508 | B1 | 6/2003 | Epstein et al. | |
| 6,826,694 | B1 | 11/2004 | Dutta et al. | |
| 6,978,378 | B1 * | 12/2005 | Koretz | 713/193 |

* cited by examiner

*Primary Examiner* — Edan Orgad
*Assistant Examiner* — Roderick Tolentino
(74) *Attorney, Agent, or Firm* — Eric Froehlich; Robert D. Morelli

(57) ABSTRACT

A method of securely transferring files from an un-trusted to a trusted network is disclosed. A file that is an archive file of many component files is separated into constituent files. Each file is stored on a server connected to an un-trusted network, and a series of initial checks, such as virus, file size, and file extension are performed. If the files pass, additional, file format specific security rules are applied. An open format transform is performed on proprietary format type files, and embedded file components are separated out. A user-definable security rule set is performed on each open format transform component. If all security tests pass, the file is reassembled and saved as a trusted file in the same format as the original file.

16 Claims, 2 Drawing Sheets

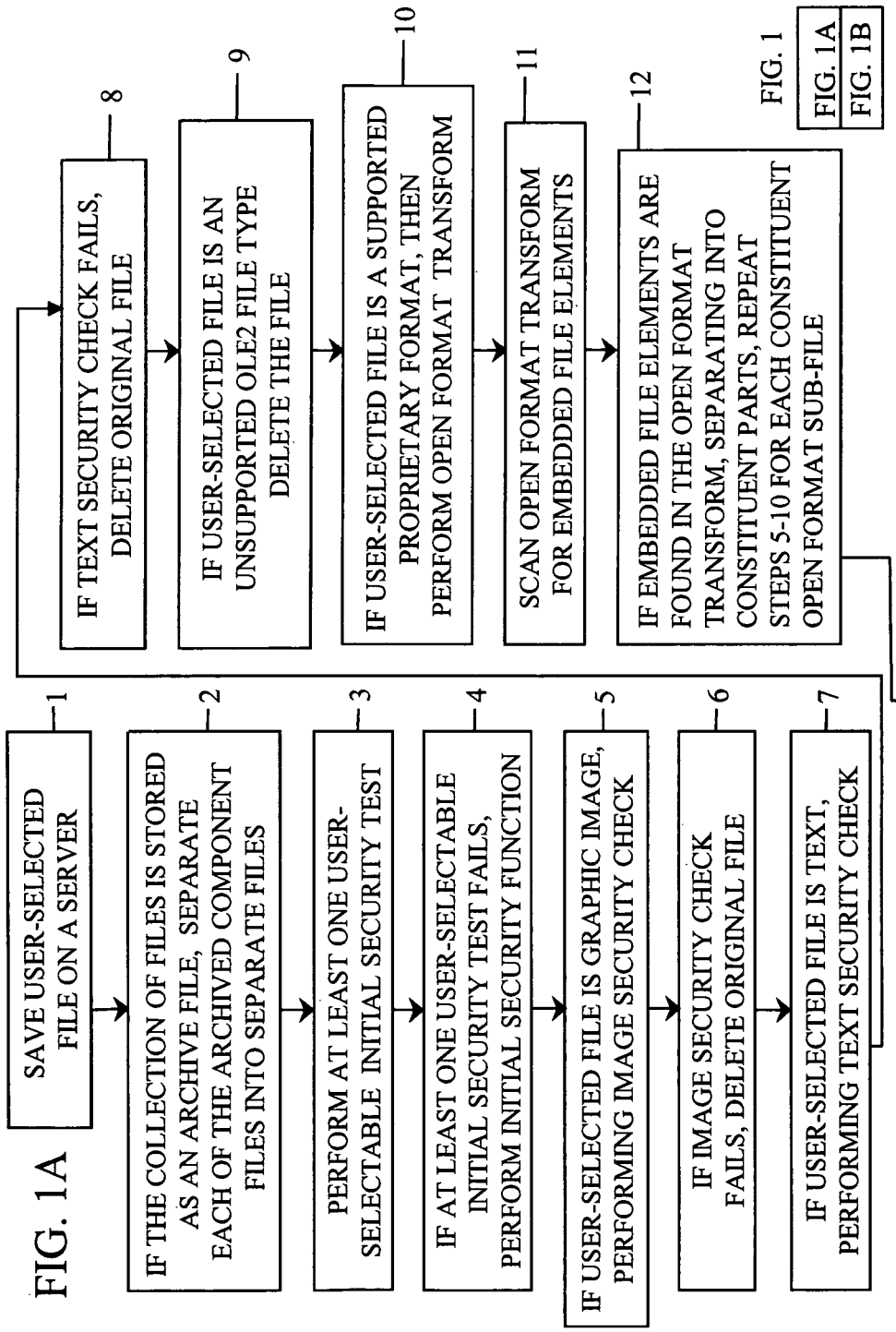

METHOD OF SECURE FILE TRANSFER

FIELD OF THE INVENTION

The present invention relates, in general, to multi-computer data transferring and, in particular to computer-to-computer data transfer regulating.

BACKGROUND OF THE INVENTION

With each coming year, office documents are required or expected to contain richer media content and more diverse methods of displaying data. The advantage is that it is substantially easier to produce professional-looking documents from the desktop.

These richly formatted, unstructured data files make it substantially easier to pass malicious code as well. Interpreters such as Microsoft Word or Ghostview open these files and may inadvertently execute malicious scripts, macros, etc. contained within the seemingly innocuous office file.

Deterring the malicious content is a challenge. The simplest solution for eliminating the risk of passing this kind of content is to simply prohibit the transfer of files that can contain malicious code. This leaves simple ASCII text files and images, among others, that can be transferred, making these content-oriented files less useful.

The key to safely emailing office documents is recognizing and prohibiting any code that could cause an interpreting application to do anything other than render the intended document. However, the list of known problems, vulnerabilities, and exploits is continually evolving. Since email exploit shields usually operate by specifying what a "bad" file or "bad" content, is, they cannot combat vulnerabilities newer than the last definition of "bad" files. This is an inherent design flaw of all signature-based solutions.

U.S. Pat. No. 5,940,591, entitled "APPARATUS AND METHOD FOR PROVIDING NETWORK SECURITY," discloses a method of performing security functions on a non-secure network. The method uses a multi-level secure network architecture to support services to many domains from one, offering communications services (video, audio, others) over a trusted security protocol, which exists at the security perimeter created by the secure network interface units. The guard is a session manager to an external set of networks. This method requires the selection of portions that do not require the same level of trust. Although the system checks access control, individual files are not verified for malicious code. The present invention is not limited in this regard. U.S. Pat. No. 5,940,591 is hereby incorporated by reference into the specification of the present invention.

U.S. Pat. No. 6,584,508, entitled "ADVANCED DATA GUARD HAVING INDEPENDENTLY WRAPPED COMPONENTS," discloses a method of increasing the security of a data guard. The data guard is configurable, for items such as HTTP traffic, SMTP traffic, etc. A set of proxy servers sits between an "internal" network and an "external" network and examines traffic. The first proxy server communicates with the internal computer network, and the second proxy server communicates with the external network. Protocol specific operations are converted to protocol independent data. Administrators define security policies that affect the information going between the proxy servers, deciding which information to pass. The system uses two-way communications that provide an adversary with information regarding the security protocols used. The present invention is not limited in this regard. U.S. Pat. No. 6,584,508 is hereby incorporated by reference into the specification of the present invention.

U.S. Pat. No. 6,826,694, entitled "HIGH RESOLUTION ACCESS CONTROL," discloses a method for performing security functions at a firewall. After a packet is received at a firewall, the header is checked. A rule specific to the header information is applied to analyze the content of the packet at the firewall. Changing the packet header to a benign file type is relatively simple. Malicious code may then pass through the firewall. The present invention is not limited in this regard. U.S. Pat. No. 6,826,694 is hereby incorporated by reference into the specification of the present invention.

SUMMARY OF THE INVENTION

It is an object of the present invention to provide a method of one-way file transfer to a variety of file formats, without introducing malicious code into a trusted network.

The first step of the present invention is saving at least one user-selected file to a first server connected to a first network, the first network being an un-trusted network. The first server is the entry point for transferring files from an un-trusted network to a trusted network. The operating system of the first server is any security enhanced operating system that supports type enforcement.

In the second step, if the user-selected file is a collection of files stored as an archive file, then separate each of the archived component files into separate files.

The third step is performing at least one initial security test on the at least one user-selected file. The initial security test includes one or more user-definable security rules, such as a virus scan, a file size check, a file extension type check, a comparison test between the file type and the file extension, and/or any equivalent set of security tests.

In the fourth step, if the initial security test fails, perform a user-definable initial security function on the user-selected file. The user-definable initial security function may include stopping further processing of the file, sending an alert message, or other like functions.

In the fifth step, if the user-selected file comprises a graphic image, then perform at least one user-definable image security check on the user-selected file. The at least one user-definable image security check comprises at least one security rule.

In the sixth step, if any of the security rules in the at user-definable image security check is violated, delete the user-selected file from the server.

In the seventh step, if the user-selected file comprises text, perform at least one user-definable text security check on the file.

In the eighth step, if one of the at least one security rule in the user-definable text security check is violated; delete the file from the server.

In the ninth step, if the user-selected file comprises an unsupported proprietary format file type, delete the user-selected file.

In the tenth step, if the user-selected file comprises a supported proprietary format file type, perform an open format transform on the user-selected file. The open format transform returns at least one open format transform sub-files, depending on the file type. In the preferred embodiment, an allowed proprietary format file type is an OLE2 file type is of one of a spreadsheet document, a text processor document, and a presentation document. In the preferred embodiment, the open format transform is an XML transform.

The eleventh step of the present method is scanning the open format transform sub-files for embedded file elements.

In the twelfth step, if embedded file elements are found in the open format transform sub-files, and then separate the embedded file elements into constituent parts. Repeat steps five through step ten for each constituent parts of the open format transform sub-files.

The thirteenth step is performing at least one user-definable open format security check on the open format transform sub-file. The at least one user-definable open format security check comprises at least one security rule.

In the fourteenth step, if any of the security rules in the user-definable open format security check is violated, save the file as a .PDF format file and delete the original file from the server.

The fifteenth step of the present method is repeating steps five through step fourteen for each open format transform sub-file.

In the sixteenth step, if no security rules were violated, then reassemble the constituent parts of the user-selected file into at least one trusted file, in the original file format.

The seventeenth, and last step of the present method is deleting the original user-selected file and any constituent parts.

BRIEF DESCRIPTION OF THE DRAWINGS

FIG. 2 is a conceptual view of the present invention.

DETAILED DESCRIPTION

Figure 1B:
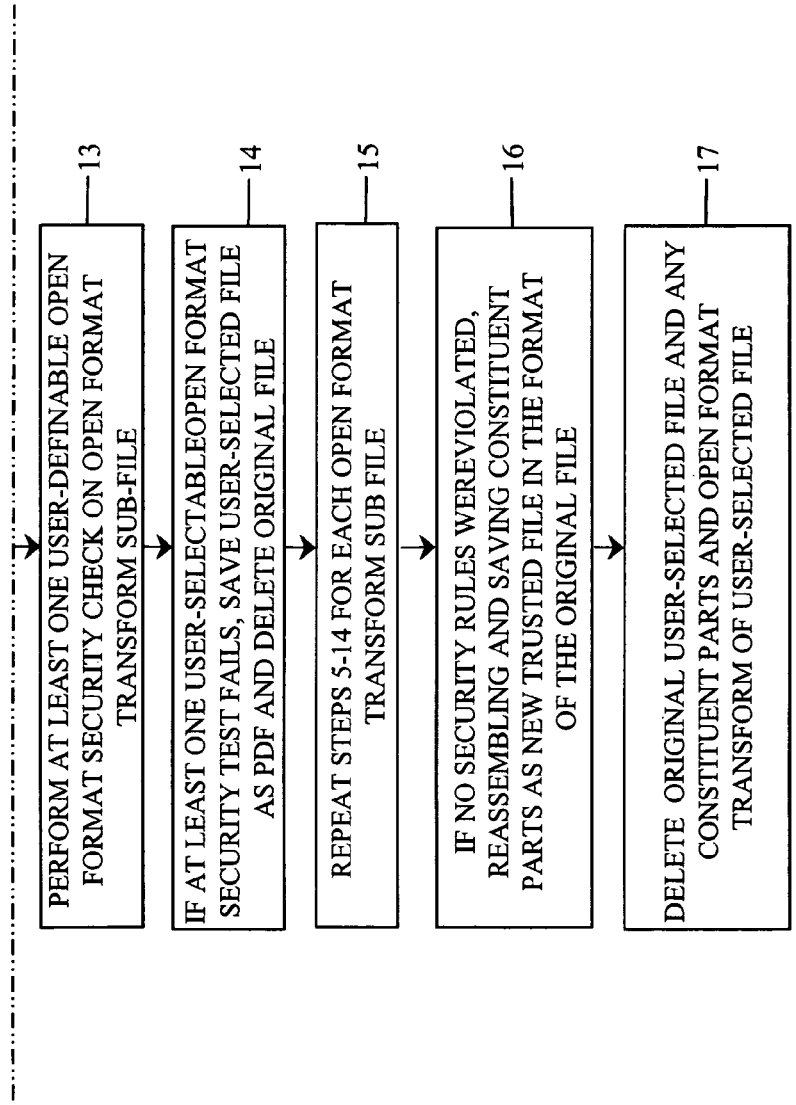
FIG. 1 is a flowchart of steps of the present invention.

The present invention is a novel method of providing one-way file transfer to a variety of file formats.

Software developers generally develop a product to fill a specific business need, such as inventory tracking or desktop publishing. In most of these cases, users need to move files or data from outside the business to a network within the business. Businesses want their networks to be trusted sites, so the important business data contained therein can be relied upon. Unscrupulous persons may try to harm the business by introducing malicious code into the business records.

As described above, the prior art methods do not protect the businesses trusted network by providing secure transfer of files from the un-trusted network. Embedded malicious code can also hide in files that appear safe, based on their file extension.

The present invention also provides a cleaning operation; files being transferred to a trusted network are scanned, mitigating the threat of malicious code entering a trusted network.

The present invention is ideally suited to provide network administrators with secure file transfer for proprietary file formats, such as those included in the Microsoft® Office suite of software applications. However, the present invention is not limited to proprietary formats, and open standard file formats are checked before sending to the trusted network.

FIG. 1 is a flowchart of the steps of the present invention.

The first step 1 of the present method is saving at least one user-selected file on a server connected to an un-trusted network. The un-trusted network may be the Internet, a network from a business associate, or the like. The user may save one file or multiple files to the server. A saved file may contain embedded pictures, macros, clipart, graphics, or be an archive file.

In the preferred embodiment, the server is running a security enhanced operating system that supports type enforcement. Examples of such an operating system include SELinux with active policy enforcement targeted for this specific application, Trusted Solaris Operating System from Sun, and STOP from DigitalNet Government Solutions LLC. Preferably, the invention is configured to operate on a system that takes advantage of the Safer Computing Initiative. Examples of the Safer Computing Initiative include LaGrande from Intel®, or Pacifica from AMD. In such configurations, a protected area of memory is provided for trusted files, and an unprotected area of memory for un-trusted files. Persons skilled in the art will recognize that the Safer Computing Initiative includes other important features, such as an attestation requirement on system boot up.

In an alternate embodiment that is complying with the concepts of the Safer Computing Initiative, the at least one user selected file is stored in unprotected memory on the server.

The server also has a connection to the trusted, or internal business network.

In the second step 2 of the present method, if the at least one user-selected file is a collection of files stored as an archive file, separating each of the archived component files into separate at least one user-selected files.

In practice, a user may store archive files in a .zip format, or may zip files together to compress the files before sending them to a recipient.

The third step 3 of the present method is performing an initial security test on the at least one user-selected file. Persons skilled in the art will recognize the at least one user-selected file includes all component files, if any, separated in step 2.

The initial security test is configurable by an administrator, configuration specialist, or other administrative personnel, and may include a virus scan, a file size check, a file extension check, a comparison test between the file type and the file extension, any equivalent security test, and any combination thereof. Persons skilled in the art will recognize that preferably, each of the previously mentioned security tests is performed in a forced sequence. In the preferred embodiment, if one of the initiated initial security tests does not function, all further processing steps stop until administrative personnel intervene.

In the fourth step 4 of the present method, if the initial security test fails, a user-definable initial security function is performed on the at least one user-selected file.

The user-definable initial security function comprises a user-definable set of security rules. The user-definable set of security rules are selected from the set of security rules consisting of sending an alert to the un-trusted network, sending an alert to the trusted network, stopping further processing, creating a PDF format file of said at least one user-selected file, logging an error event on the server, deleting the at least one user-selected file, any equivalent set of security rules, and any combination thereof.

Persons skilled in the art will recognize that sending a message to the un-trusted network can create a security risk, alerting a person to the fact that the file transfer did not occur and possibly the reason why it did not occur, giving a malicious user additional feedback towards compromising the system.

In practice, an alert is not sent to the un-trusted network, and a user-selected file that fails the initial security test is deleted. Preferably, when the sender makes a simple mistake, such as sending an archive file that is too large, a message is routed back to the sender informing him of the mistake.

In an alternate embodiment using the concepts of the Safer Computing Initiative, the at least one user selected file is transferred from the server's unprotected memory to the server's protected memory.

In the fifth step 5, if the at least one user-selected file comprises a graphic image, perform at least one user-definable image security check on the user-selected file. The user-definable image security check comprises at least one security rule.

In the sixth step 6, if any of said at least one security rule in the at least one user-definable image security check is violated, deleting said at least one user-selected file of said graphic image from said server.

In the seventh step 7, if the at least one user-selected file comprises text, performing at least one user-definable text security check on the user-selected file. The user-definable text security check comprises at least one security rule.

In the eighth step 8, if any of the at least one security rule in the at least one user-definable text security check is violated, deleting the file from the server.

In the ninth step 9, if the at least one user-selected file comprises an unsupported proprietary format file delete the user-selected file.

In the tenth step 10, if the at least one user-selected file comprises a supported proprietary format file type performing an open format transform on the user-selected file. The open format transform returns at least one open format transform sub-file, depending upon the file type.

In the preferred embodiment, a supported proprietary format file type is an OLE2 file type is of one of a spreadsheet document, a text processor document, and a presentation document. However, those persons skilled in the art will recognize that other proprietary format file types may be supported.

A word processor file has the file extension .doc if it is a Microsoft Word file. Other word processors, such as WordPerfect, etc. will have an analogous file extension.

A presentation file has the file extension of .ppt or .pps, if it is a Microsoft PowerPoint file. Other presentation files will have an analogous file extension.

A spreadsheet has the file extension .xl, .xls, .xla, .xlt, .xlm, .xlc, if it is a Microsoft Excel file. Other spreadsheet files will have an analogous file extension.

By way of example, if the user-selected file is from the Microsoft Office suite (Word, Excel, PowerPoint), convert the user-selected file to an open format delimited format; preferably, using a commercial product such as OpenOffice.org or Sun's StarOffice is used. In the preferred embodiment, the open format transform is an XML transform.

The eleventh step 11 of the present method is scanning the at least one open format transform sub-files for embedded file elements.

In the twelfth step 12, if embedded file elements are found in the at least one open format transform sub-files, the embedded file elements are separated into constituent parts. Steps five 5 through step ten 10 are repeated for each constituent parts of the open format transform sub-files.

The thirteenth step 13 of the present method is performing at least one user-definable open format security check on the at least one open format transform sub-file. The at least one user-definable open format security check comprises at least one security rule.

In the fourteenth step 14, if any of the at least one security rule in the at least one user-definable open format security check is violated, saving the at least one user-defined file as a .PDF format file and deleting the at least one user-selected file from the server.

Preferably, unknown and disallowed object types are tagged as "bad" and not passed. Allowed object types that conform to the security rules for the particular object type, are passed.

The fifteenth step 15 in the present method is repeating steps five 5 through step fourteen 14 for each open format transform sub-file.

In the sixteenth step 16, if no security rules were violated, the constituent parts of the user-selected file are reassembled and saved as a trusted file in the original format. If no constituent parts of the at least one user-selected file existed, the user-selected file is saved as one trusted file in the same format as the original file.

The seventeenth, and final, step 17 of the present method is deleting the original at least one user-selected file and any constituent parts of the at least one user-selected file. At this stage in the present method, temporary files that were created for processing are deleted to save space on the server.

In an alternate embodiment using the concepts of the Safer Computing Initiative, any created PDF files are sent to the protected memory of the server. The recipient may access the files and save the files to a local machine.

FIG. 2 shows a general overview of the present invention. The file sender 20 has at least one file on the un-trusted network 22 and saves a user-selected file on the server 24. The server runs a security enhanced operating system that supports type enforcement. A series of security checks are performed on the user-selected file, and if all of the checks pass, the user-selected file is sent to the trusted network 26. Once the user-selected file is saved on the trusted network 26, the file recipient 28 may access the file.

While the preferred embodiments of the invention have been illustrated and described, it will be apparent to those of ordinary skill in the art that various changes and modifications may be made without deviating from the inventive concepts set forth above.

What is claimed is:

1. A method of transferring files from an un-trusted computer network to a trusted computer network, comprising the steps of:
    a) saving at least one user-selected file on a server connected to an un-trusted network, said server running an security enhanced operating system with type enforcement;
    b) if the at least one user-selected file is a collection of files stored as an archive file, separating each of the archived component files into separate at least one user-selected files;
    c) performing at least one initial security test on said at least one user-selected file;
    d) if said at least one initial security test fails, performing a user-definable initial security function on said at least one user-selected file;
    e) if said at least one user-selected file comprises a graphic image, performing at least one user-definable image security check on said at least one user-selected file, said at least one user-definable image security check comprising at least one security rule;
    f) if any of said at least one security rule in the at least one user-definable image security check is violated, deleting said at least one user-selected file of said graphic image from said server;
    g) if said at least one user-selected file comprises text, performing at least one user-definable text security check on said at least one user-selected file, said at least one user-definable text security check comprising at least one security rule;

h) if any of said at least one security rule in the at least one user-definable text security check is violated, deleting said at least one user-selected file of said text from said server;

i) if said at least one user-selected file comprises an unsupported proprietary format file type deleting said at least one user-selected file;

j) if said at least one user-selected file comprises a supported proprietary format file type, performing an open format transform on said at least one user-selected file, said open format transform returning at least one open format transform sub-files;

k) scanning said at least one open format transform sub-file for embedded file elements;

l) if embedded file elements are found in said at least one open format transforms sub-files, separating said embedded file elements into constituent parts of said at least one open format transform sub-files and repeating steps (e) through (j) for each constituent parts of said at least one open format transform sub-files;

m) performing at least one user-definable open format security check on said at least one open format transform sub-file, said at least one user-definable open format security check comprising at least one security rule;

n) if any of said at least one security rule in the at least one user-definable open format security check is violated, saving said at least one user-defined file as a .PDF format file and deleting said at least one user-selected file from said server;

o) repeating steps (e) through (n) for each open format transform sub-file;

p) if no security rules were violated, reassembling and saving said constituent parts of said at least one user-selected file into at least one trusted file, in the format of the original user-selected file, and if no constituent parts of said at least one user-selected file existed, saving said at least one user-selected file into at least one trusted file, in the format of the original user-selected file; and q) deleting said at least one user-selected file and any constituent parts of said at least one user-selected file.

2. The method of claim 1, wherein said at least one user-definable initial security test is selected from the group of security tests consisting of a virus scan, a file size check, a file extension type check, a comparison test between the file type and the file extension, any equivalent set of security test, and any combination thereof.

3. The method of claim 2, wherein said user-definable initial security function comprises a user-definable set of security rules, said user-definable set of security rules selected from the set of security rules consisting of sending an alert message to said un-trusted network, sending an alert message to said trusted network, stopping further processing, creating a .PDF format file of said at least one user-selected file, logging an error event on said first network server, deleting the at least one user-selected file, any equivalent set of security rules, and any combination thereof.

4. The method of claim 3, wherein said at least one user-definable second security test is selected from the group of security tests consisting of a virus scan, a file size check, a file extension type check, a comparison test between the file type and the file extension, any equivalent set of security test, and any combination thereof.

5. The method of claim 4, wherein said user-definable secondary security function comprises a user-definable set of security rules, said user-definable set of security rules selected from the set of security rules consisting of sending an alert message to said trusted network, stopping further processing, creating a .PDF format file of said at least one user-selected file, logging an error event on said server, deleting the at least one user-selected file, any equivalent set of security rules, and any combination thereof.

6. The method of claim 5, wherein said proprietary format file type is an OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

7. The method of claim 6, wherein said step of performing a user-definable open format security check on said at least one open format transform sub-file comprises the step of saving said at least one user-defined file as a .PDF format file and deleting said at least one open format transform sub-files and the corresponding at least one user-selected file from said server.

8. The method of claim 7, wherein said server further comprises unprotected memory and protected memory, said at least one user-selected file saved to said unprotected memory, said at least one trusted file saved to said protected memory, and any PDF file created saved to said protected memory.

9. The method of claim 8, wherein said open format transform is a XML transform.

10. The method of claim 1, wherein said user-definable initial security function comprises a user-definable set of security rules, said user-definable set of security rules selected from the set of security rules consisting of sending an alert message to said un-trusted network, sending an alert message to said trusted network, stopping further processing, creating a .PDF format file of said at least one user-selected file, logging an error event on said first server, deleting the at least one user-selected file, any equivalent set of security rules, and any combination thereof.

11. The method of claim 1, wherein said at least one user-definable second security test is selected from the group of security tests consisting of a virus scan, a file size check, a file extension type check, a comparison test between the file type and the file extension, any equivalent set of security test, and any combination thereof.

12. The method of claim 1, wherein said user-definable secondary security function comprises a user-definable set of security rules, said user-definable set of security rules selected from the set of security rules consisting of sending an alert message to said trusted network, stopping further processing, creating a .PDF format file of said at least one user-selected file, logging an error event on said server, deleting the at least one user-selected file, any equivalent set of security rules, and any combination thereof.

13. The method of claim 1, wherein said proprietary format file type is an OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

14. The method of claim 1, wherein said step of performing a user-definable open format security check on said at least one open format transform sub-file comprises the step of saving said at least one user-defined file as a .PDF format file and deleting said at least one open format transform sub-files and the corresponding at least one user-selected file from said server.

15. The method of claim 1, wherein said server further comprises unprotected memory and protected memory, said at least one user-selected file saved to said unprotected memory, said at least one trusted file saved to said protected memory, and any PDF file created saved to said protected memory.

16. The method of claim 1, wherein said open format transform is a XML transform.

* * * * *